(12) United States Patent
Belik et al.

(10) Patent No.: US 7,956,877 B2
(45) Date of Patent: Jun. 7, 2011

(54) CONVERTING A THREE PRIMARY COLOR INPUT SIGNAL INTO FOUR SIGNALS

(75) Inventors: Oleg Belik, Eindhoven (NL); Gerben Johan Hekstra, Eindhoven (NL); Nalliah Raman, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 877 days.

(21) Appl. No.: 11/911,570

(22) PCT Filed: Apr. 13, 2006

(86) PCT No.: PCT/IB2006/051150
§ 371 (c)(1),
(2), (4) Date: Oct. 15, 2007

(87) PCT Pub. No.: WO2006/111897
PCT Pub. Date: Oct. 26, 2006

(65) Prior Publication Data
US 2008/0186327 A1 Aug. 7, 2008

(30) Foreign Application Priority Data

Apr. 21, 2005 (EP) ..................................... 05103235
Aug. 30, 2005 (EP) ..................................... 05107933

(51) Int. Cl.
*G09G 5/02* (2006.01)
(52) U.S. Cl. ......................... 345/690; 345/604; 345/609
(58) Field of Classification Search .......... 345/603–604, 345/609, 690–694
See application file for complete search history.

(56) References Cited

U.S. PATENT DOCUMENTS

| 6,570,584 B1 | 5/2003 | Cok et al. |
| 7,277,075 B1 * | 10/2007 | Hirano et al. ................... 345/89 |
| 2005/0099426 A1 | 5/2005 | Primerano et al. |

FOREIGN PATENT DOCUMENTS

| EP | 1475771 A2 | 11/2004 |
| WO | WO2006106457 A1 | 10/2006 |

OTHER PUBLICATIONS

Wen,S.: "Design of Relative Primary Luminances for Four Primary Displays"; Displays [Online], vol. 26, No. 4-5, Jul. 26, 2005 pp. 171-176, XP002353023.

* cited by examiner

*Primary Examiner* — Alexander Eisen
*Assistant Examiner* — Robin Mishler
(74) *Attorney, Agent, or Firm* — Edward W. Goodman (57) ABSTRACT

A method of converting a three primary color input signal into a four primary color drive signal, includes defining three functions representing the first, second, and third drive signals as a function of the fourth drive signal, determining the intersection values of the fourth drive signal at a set of intersections of the three functions mutually, and of the three functions and a line defined by the fourth drive signal being equal to itself, determining boundary values of a valid range of the fourth drive signal in which all drive signals have valid values, determining calculated values of the first, second and third drive signals at the intersection values and the boundary values, calculating the maximum value (Vmax) or minimum value (Vmin) of the calculated values at the intersection, and selecting the intersection value at which the maximum value or minimum value is minimum or maximum, respectively.

15 Claims, 4 Drawing Sheets

CONVERTING A THREE PRIMARY COLOR INPUT SIGNAL INTO FOUR SIGNALS

The invention relates to a method of converting a three primary color input signal into four drive signals for driving four primary colors of a multi-primary color display, to a system for converting a three primary color input signal into four drive signals, to a display apparatus comprising this system, to a computer program product for converting the three primary color input signal into four drive signals, to a camera comprising the system, and to a portable device comprising the camera.

U.S. Pat. No. 6,570,584 discloses an OLED display device with more sub-pixels than the conventional red, green, and blue sub-pixels. The additional sub-pixel may have a color selected outside the color gamut possible with the usual red, green, and blue sub-pixels to obtain a wider color gamut. Alternatively, the additional sub-pixel may have a color inside the color gamut possible with the red, green, and blue sub-pixels to increase the efficiency and lifetime of the display. The display system uses a conventional RGB input signal to create an appropriate multi-color signal for driving all the sub-pixels.

A color data transformation circuit converts the input signal to values necessary for controlling each of the sub-pixels. The transformation circuit calculates the appropriate amounts of light from each of the three available sub-pixel colors to reproduce the desired color at each of the four sub-pixels using well known matrix transforms or lookup tables. The amount of light produced by a sub-pixel depends on a numerical value supplied to the sub-pixel. The numerical value is, for example an eight or six bit value. In general, the three primary input signal can be transformed into the four drive values of the sub-pixels in different ways.

A transformation circuit which performs matrix transformations has the drawback that a lot of matrix multiplications are required. Either an expensive and fast calculation circuit is required or an algorithm has to be constructed to pre-calculate the majority of the computationally intensive mathematical calculations to enable real time operation. A pre-calculation and a transformation circuit which uses look-up tables have the drawback that the algorithm is pre-fixed to one of the possible solutions.

It is an object of the invention to provide a method of converting a three primary color input signal into four drive signals for driving four primary colors of a multi-primary color display which conversion has a high flexibility in selecting one out of the possible solutions.

A first aspect of the invention provides a method as claimed in claim 1. A second aspect of the invention provides a system as claimed in claim 7. A third aspect of the invention provides a display apparatus as claimed in claim 8. A fourth aspect of the invention provides a computer program product as claimed in claim 12. A fifth aspect of the invention provides a camera as claimed in claim 14. A sixth aspect of the invention provides a portable device as claimed in claim 15. Advantageous embodiments are defined in the dependent claims.

The method in accordance with the first aspect of the invention converts a three-primary color input signal into four drive signals which drive four primary colors of a multi-primary color display. The three-primary color input signal usually is a RGB signal, but any other signal which defines the drive signals of a usual display which has three differently colored sub-pixels may be used instead. The three-primary color input signal may be defined in the XYZ space. But, now, in the multi-primary color display which has four differently colored sub-pixels, four drive signals have to be supplied to the four sub-pixels. Usually, the multi-primary color display has, per pixel, the three standard RGB sub-pixels and at least one further sub-pixel with a different color. The different color may be selected inside or outside the color gamut defined by the RGB sub-pixels. The different color may be white.

The three-primary color input signal comprising a first, a second, and a third input signal. The method converts these input signals into a four-primary color drive signal comprising a first, second, third, and fourth drive signal. These drive signals drive the four primary colors of the multi-primary color display. Although it is said that the drive signals drive primary colors, in fact the colors of the four sub-pixels need not be primary colors as defined in the colorimetric theory. Whichever colors are selected for the sub-pixels does not matter, they act like primary colors because they determine the colors to be displayed on the display.

The method defines three functions representing the first, second, and third drive signal as a function of the fourth drive signal. In a linear system, these three functions are straight lines. In a non-linear color space the three functions may define bending lines. Next, values of the fourth drive signal are determined for intersections of: (i) the three functions mutually, and (ii) the three functions and a line defined by the fourth drive signal being equal to itself. These values of the fourth drive signals at all of these intersections are further referred to as the intersection values. With respect to the intersections defined by (i) and (ii), only the intersection values are relevant of functions having opposite signs of their first derivative. Further, the intersections of the functions with the boundary lines are found directly by calculating the values of the first, second, and third functions at the boundary values of the fourth drive signal. The boundary values of the fourth drive signal are found by determining the range of values of the fourth drive signal where all four drive signals have valid values. The valid values are values which are allowed in the hardware or software implementation of the conversion algorithm. For example, in a digital implementation, valid values may the values in the range 0 to 255 if the signals are represented with 8 bit words. The valid values may be normalized to, for example only, a range from 0 to 1. The determination of the valid range of the fourth drive signal is elucidated in detail in the not yet published European patent application 05102641.7.

The method calculates the associated first, second and third drive signals at the intersection values of the fourth drive signal to obtain calculated values. At each one of the intersection values, either the maximum value or the minimum value of the set of values comprising the intersection value and the calculated values at this intersection value is determined. This set of values is further referred to as the values of interest. Finally, the intersection value is selected at which the maximum value is minimum, or at which the minimum value is maximum. Thus, now a particular one of the all possible combinations of the four drive signals fitting the three input signals is selected. In fact, the freedom in the conversion from the three input signals to the four output signals is used to optimize the conversion under a constraint which in this case is either (i) the minimal value of the maximum values of drive values at the relevant intersections, or (ii) the maximal value of the minimum values of the drive values at the relevant intersections.

The determination of the maximum value of the set of values, at each relevant intersection value of the fourth drive signal, provides the highest one of the four drive signals at the associated intersection value. If the intersection value is selected at which this highest value is minimal, this is the conversion which produces the lowest maximum value of the four drive values. Which is, for example, advantageous in a display in which a backlight is modulated and the drive voltages are scaled accordingly. The selection of the conversion which produces the minimal maximum value allows the backlighting to be dimmed maximally. If the intersection value is selected at which the minimum value is maximal, this is the conversion which produces the highest minimal value of the four drive values. This is, for example, advantageous in a display in which a gamma at low levels is not very reproducible and low drive voltages should be prevented as much as possible.

In an embodiment in accordance with the invention as defined in claim 2, in a linear system, the three functions are lines and thus can easily be determined.

In an embodiment in accordance with the invention as defined in claim 3, the intersections of lines with a different sign of their respective first derivative can be determined with a simple equation.

In an embodiment in accordance with the invention as defined in claim 4, if an intersection occurs for an intersection value of the fourth drive value which is outside the valid range, this intersection value is clipped to the nearest boundary value of the fourth drive value. The boundary values of the fourth drive value are the extreme values of a range of valid values of the fourth drive value.

In an embodiment in accordance with the invention as defined in claim 5, the valid range of the fourth drive value is determined by determining for the first, second, and third drive signal a respective range of the fourth drive signal for which the first, second, or third drive signal has valid values. The valid range of the fourth drive value is defined as a common range of the fourth drive signal wherein each one of the first, second, and third drive signal has valid values.

In an embodiment in accordance with the invention as defined in claim 6, the input signal is clipped if the common range of the fourth drive signal is not realizable.

Figure 1:
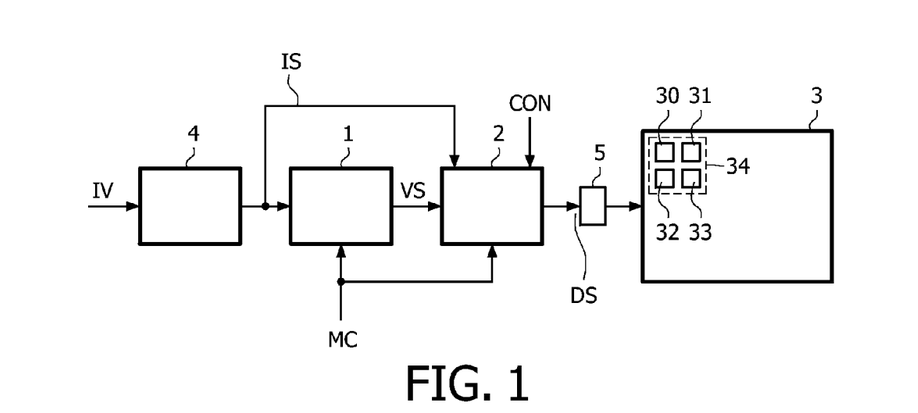
FIG. 1 shows schematically a block diagram of a converter in accordance with the invention.

FIG. 1 shows schematically a block diagram of a converter in accordance with the invention. The converter comprises a signal processing circuit 4, a valid range determining function 1, further referred to as the range function 1, a selection function 2, a display drive function 5, and a display 3. The signal processing circuit 4, the range function 1, and the selection function 2 may be realized by a suitably programmed processor or by dedicated hardware which processes a software algorithm.

The signal processing circuit 4 receives an image input signal IV and supplies the primary color input signal C1, C2, C3. The range function 1 receives the three input signals C1, C2, C3 and a coefficient matrix MC to supply the common range VS of a fourth drive value P4. The three input signal components C1, C2, C3 are commonly referred to as IS, and this signal is usually the RGB signal, but may be another signal defining the amount of light of the three sub-pixels per pixel of a standard three sub-pixel display. In accordance with the present invention, these three input signals IS have to be transformed into, or mapped on, drive signals P1 to P4 for the four sub-pixels 30 to 33 per pixel 34 of the four sub-pixel display 3. The drive signals P1 to P4 are collectively also referred to as DS. The range function 1 uses three functions F1 to F3 (see FIG. 2) which each define one of three of the drive values P1 to P3 as a function of the input signals IS and the remaining fourth drive value P4. The coefficient matrix MC is defined by the color points of the 4 sub-pixels.

Figure 2:
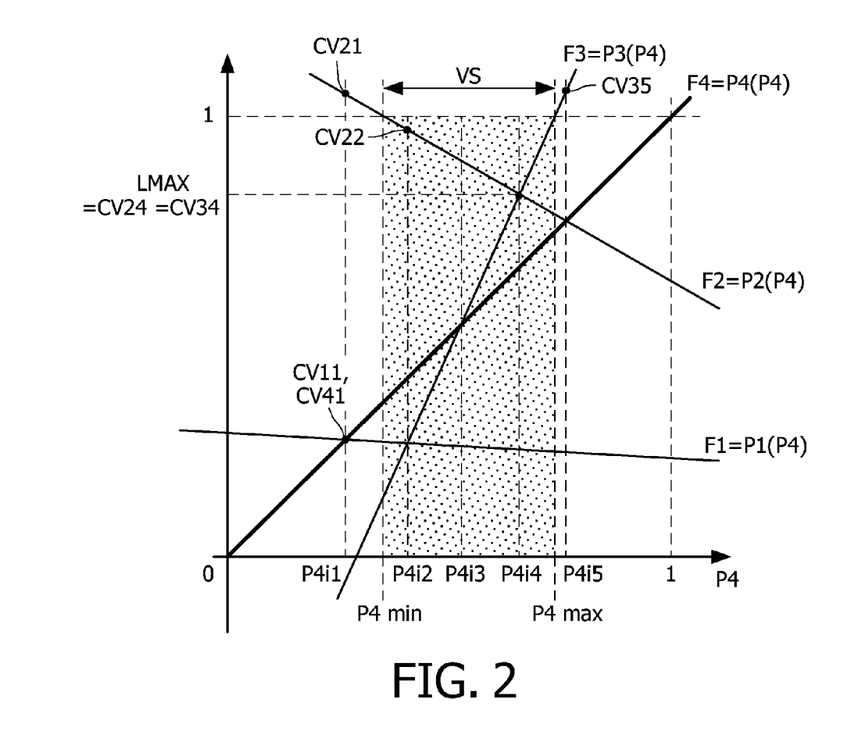
FIG. 2 shows an example of graphs of the four drive values as a function of the fourth drive value.

The operation of the range function 1 is detailed in FIG. 2 for the three to four primary conversion when normalized drive values are used.

The selection function 2 receives the valid range VS, the input signals IS, the coefficient matrix MC, and a selection criterion or constraint CON to supply the N drive signals DS via the display drive function 5 to the sub-pixels 30 to 33 of the display 3. The display drive function 5 may comprise a gamma function when the operations in front of the display drive function 5 are performed in the linear light domain.

The present invention is directed to implementing a particular constraint CON such that out of the possible mappings from the three input signals C1, C2, C3 to the four drive signals P1 to P4 an optimal one is selected. First the three functions F1=P1(P4), F2=P2(P4), and F3=P3(P4) representing the first, second, and third drive signal P1, P2, P3 as a function of the fourth drive signal P4 are determined. Then, the intersection values P4$i$ of the fourth drive signal P4 are determined at a set of intersections of: the three functions F1, F2, F3 mutually, and of the three functions F1, F2, F3 and the line F4 defined by the fourth drive signal P4 being equal to itself. Only the intersection values P4$i$ of functions having opposite signs of their first derivative are relevant. Now, the first, second and third drive signals P1, P2, P3 at the intersection values P4$i$ of the fourth drive signal P4 are calculated to obtain calculated values CV1, CV2, CV3. Further, the associated first, second and third drive signals P1, P2, P3 are calculated at the boundary values P4min, P4max of a valid range VR of the fourth drive signal P4. These sets of values are referred to as the values of interest (CV1, CV2, CV3, P4$i$) which comprise the intersection values P4$i$ and the boundary values P4min, P4max of the fourth drive signal P4 and the associated calculated values CV1, CV2, CV3. For each set a maximum value Vmax or minimum value Vmin of the values of interest CV1, CV2, CV3, P4$i$ at the associated value of the fourth drive value P4 is determined. The associated value P4 is either one of the intersection values or one of the maximum value Vmax or minimum value Vmin. Finally, the value of the fourth drive value P4 at which the maximum value Vmax or minimum value Vmin is minimum or maximum, respectively, is selected. This algorithm is further elucidated with respect to FIGS. 2 and 3.

The signal processing circuit 4 may be replaced by a camera, the three input signals C1, C2, C3 are supplied by the camera, and the input signal IV is not present. The camera may also supply the four drive signals P1, P2, P3, P4. Preferably the camera accepts user input defining whether it should supply the three input signals C1, C2, C3 or the four drive signals P1, P2, P3, P4.

FIG. 2 shows an example of graphs of the four drive values as a function of the fourth drive value. The fourth drive signal P4 is depicted along the horizontal axis, and the three drive signals P1 to P3 together with the fourth drive signal P4 along the vertical axis. The three drive signals P1 to P3 are defined as functions of the fourth drive signal P4: F1=P1(P4), F2=P2(P4), and F3=P3(P4). The fourth drive signal P4 is a straight line through the origin and has a first derivative which is one. The valid ranges of the four drive signals P1 to P4 are normalized to the interval 0 to 1. The common range VS of the fourth drive signal P4 in which all the three drive signals P1 to P3 have values within their valid ranges extends from the value P4,min to P4,max, and includes these border values.

Preferably, a linear light domain is selected wherein the functions defining the three drive signals P1 to P3 as a function of the fourth drive signal P4 are defined by $$\begin{bmatrix} P1 \\ P2 \\ P3 \end{bmatrix} = \begin{bmatrix} P1' \\ P2' \\ P3' \end{bmatrix} + \begin{bmatrix} k1 \\ k2 \\ k3 \end{bmatrix} \times P4$$

wherein P1 to P3 are the three drive signals, (P1', P2', P3') are defined by the input signal which usually is a RGB signal, and the coefficients ki define a dependence between the color points of the 3 primaries associated with the 3 drive values P1 to P3, and the primary associated with the fourth drive signal P4.

To further elucidate the relation between the elements of these functions it is now shown how the above functions relate to the standard three to four primary conversion. In a standard three to four primary conversion, the drive signal DS, which comprises the drive signals P1 to P4, is transformed to the linear color space XYZ by the following matrix operation.

$$\begin{bmatrix} Cx \\ Cy \\ Cz \end{bmatrix} = \begin{bmatrix} t11 & t12 & t13 & t14 \\ t21 & t22 & t23 & t24 \\ t31 & t32 & t33 & t34 \end{bmatrix} \times \begin{bmatrix} P1 \\ P2 \\ P3 \\ P4 \end{bmatrix} \quad \text{Equation 1}$$

The matrix with the coefficients tij defines the color coordinates of the four primaries of the four sub-pixels. The drive signals P1 to P4 are unknowns which have to be determined by the multi-primary conversion. This equation 1 cannot be solved immediately because there are multiple possible solutions as a result of introducing the fourth primary. The input signal components C1, C2, C3 are now replaced by Cx, Cy, Cz to indicate that they are defined in the linear XYZ color space.

The question solved in the present invention is how to make an algorithm that efficiently deals with the freedom in conversion and which is efficient such that a real-time determination of the common range is possible. A particular real-time selection out of these possibilities for the drive values of the drive signals P1 to P4 is applied.

Equation 1 can be rewritten into:

$$\begin{bmatrix} Cx \\ Cy \\ Cz \end{bmatrix} = [A] \times \begin{bmatrix} P1 \\ P2 \\ P3 \end{bmatrix} + \begin{bmatrix} t14 \\ t24 \\ t34 \end{bmatrix} \times P4 \quad \text{Equation 2}$$

$$A = \begin{bmatrix} t11 & t12 & t13 \\ t21 & t22 & t23 \\ t31 & t32 & t33 \end{bmatrix}$$

wherein the matrix [A] is defined as the transforming matrix in the standard three primary system. Multiplication of the terms of equation 2 with the inverse matrix $[A^{-1}]$ provides Equation 3.

$$\begin{bmatrix} P1' \\ P2' \\ P3' \end{bmatrix} = \begin{bmatrix} P1 \\ P2 \\ P3 \end{bmatrix} + [A^{-1}] \times \begin{bmatrix} t14 \\ t24 \\ t34 \end{bmatrix} \times p4 \quad \text{Equation 3}$$

The vector [P1' P2" P3'] represents primary values obtained if the display system only contains three primaries. Finally, Equation 3 is rewritten into Equation 4.

$$\begin{bmatrix} P1 \\ P2 \\ P3 \end{bmatrix} = \begin{bmatrix} P1' \\ P2' \\ P3' \end{bmatrix} + \begin{bmatrix} k1 \\ k2 \\ k3 \end{bmatrix} \times P4 \quad \text{Equation 4}$$

Thus, the driving signal of any three primaries P1 to P3 is expressed by Equation 4 as a function of the fourth primary P4. These linear functions define three lines in a 2 dimensional space defined by the fourth primary P4 and the values of the fourth primary P4 as is illustrated in FIG. 2. All values in FIG. 2 are normalized which means that the values of the four drive values P1 to P4 have to be within the range $0 \leq Pi \leq 1$. From FIG. 2 it directly visually becomes clear what the common range VS of P4 is for which all the functions P1 to P3 have values which are in the valid range.

Basically, if no such common range VS exists, then the input color is outside the four primary color gamut and thus cannot be correctly reproduced. For such colors a clipping algorithm should be applied which clips these colors to the gamut.

A scheme which calculates the common range P4,min to P4,max is elucidated in the non pre-published European patent application 05102641.7.

In the example shown in FIG. 2, the boundary P4,min of the valid range VS is determined by the function F2 which has a higher value than 1 for values of P4 smaller than P4,min. The boundary P4,max of the valid range VS is determined by the function F3 which has a higher value than 1 for values of P4 larger than P4,max.

The intersection of the functions F1 and F4 occurs at the value P4i1 of the fourth drive value P4. The intersection of the functions F1 and F3 occurs at the value P4i2 of the fourth drive value P4. The intersection of the functions F3 and F4 occurs at the value P4i3 of the fourth drive value P4. The intersection of the functions F2 and F3 occurs at the value P4i4 of the fourth drive value P4. The intersection of the functions F2 and F4 occurs at the value P4i5 of the fourth drive value P4. The intersection of the functions F1 and F2 is not shown.

The intersection at P4i3 and the intersection of the functions F1 and F2 are not relevant because the first derivative of the intersecting functions has the same sign. Also, the intersections P4i1 and P4i5 are not relevant, because these intersections are outside the valid range VS. At each one of the other intersections P4i2, P4i4, and at the border values P4min, P4max the values of the functions F1 to F3 are determined. In the example shown, only the values CV11, CV21, CV31 of the functions F1 to F3 at the intersection P4i1 and the values CV14, CV24, CV34 at the intersection P4i4 are shown. The value of the function F4 at the intersection P4i1 and P4i4 is equal to the intersection value.

Now it is checked at each intersection and border value which one of the functions F1 to F4 has the highest (or lowest) value. In the example shown, the highest value of the functions F1 to F4 is for the border values and the intersection values within the valid range: P4min, P4*i*2, P4*i*4, P4max, respectively: 1, CV22, LMAX, 1.

Next the intersection or border value is selected at which the highest value is minimal (or at which the lowest value is maximal). In the example shown the minimal highest value of the functions at the intersection or border values are the values CV24 and CV34 of the functions F2 and F3, respectively, at the intersection value P4*i*4. These minimal highest values are indicated by LMAX.

Figure 3:
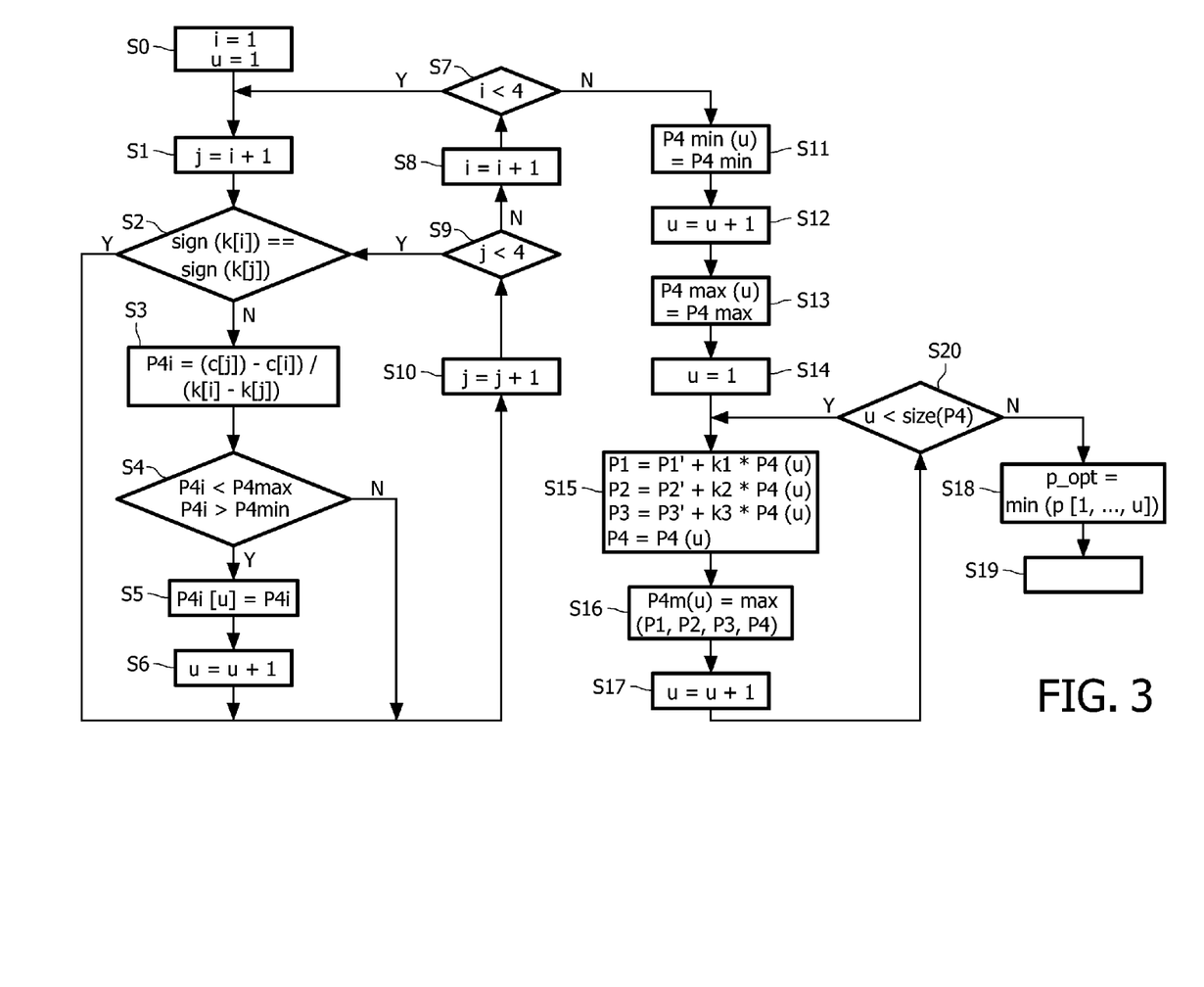
FIG. 3 shows a flowchart of an algorithm in accordance with the invention.

FIG. 3 shows a flowchart of an algorithm in accordance with the invention. In step S0 the variables i and u are set to zero. In step 1 the variable j is made equal to the variable i+1. In step S2, the sign of the coefficient k(i) is compared with the sign of coefficient k(j), wherein the coefficients k(i) and (kj) are the coefficients k1 to k3 in equation 4. If the signs are equal, the algorithm proceeds with step S10 and increments the variable j by 1. In step S9 it is checked whether the incremented variable j is smaller than 4. If yes the algorithm proceeds with step S2 if no, in step S8, the variable i is incremented by 1 and in step S7 is checked whether the incremented variable i is smaller than 4. If yes the algorithm proceeds with step S1, if no, the algorithm proceeds with step S11.

If in step S2 is detected that the signs are not equal, and thus the lines have opposite signs of the first derivative, in step S3 the intersection value P4*i* of the two lines is determined by the equation $$P4i=(Pj'-Pi')/(ki-kj)$$

wherein the Pj' and Pi' are respective ones of the P1' to P4' of equation 4 to which is added that the fourth drive signal (P4) which is equal to itself is defined by $$P4=P4'+k4*P4 \text{ wherein } P4'=0 \text{ and } k4=1.$$

In step S4 is checked whether the intersection value P4*i* is smaller than the upper limit P4max of the valid range and larger than the lower limit P4min of the valid range. If the intersection value P4*i* is not within the valid range, the algorithm proceeds with step S10. If the intersection value P4*i* is within the valid range, in step S5 its value is stored as P4($u$), and in step S6 the value of u is incremented by 1.

In step S11, the lower border value P4min is stored as P4($u$), in step S12 the value of u is incremented by 1, in step S13 the border value P4max is stored as P4($u$), and in step S14 the variable u is set to 1. In step S15, for the actual value of u, the values P1 to P3 are calculated by using equation 4 for the value of P4 stored for this value of u. The stored value of P4 is indicated by P4($u$) and is either one of the intersection values P4*i* or one of the border values P4min, P4max. Also the stored value P4($u$) itself is retrieved as the value for P4.

In step S16, the maximum value of the values P1 to P4 is stored as P4*m*(u). In step S17, the value of u is incremented by 1, and in step S20 is checked whether u<size(P4). Wherein the size(P4) is a number which is the sum of the number of intersection values P4*i* and the two border values P4min, P4max.

If yes, the values of P1 to P4 are calculated in step S15. In step S16, the maximum value P4*m*(u) of the values P1 to P4 is determined and stored. In step S17 the variable u is incremented by 1, and the algorithm proceeds with step S20. After calculation of all the maximum values, the outcome of the check in step S20 is no, and the in step S18, the minimum value P4opt of all the stored maximum values P4*m*(u) is determined. The core of the algorithm now ends in step S19.

The values of the other drive values P1 to P3 can now be calculated by substituting this optimal value P4opt in the three functions F1 to F3. This minimum value P4opt (which is Pui4 in FIG. 2) defines the selected mapping from the three primary color input signals Cx, Cy, Cz into the four drive values P1 to P4, wherein the selection is performed in using a particular constraint. The particular constraint is that, of the set of values of the functions F1 to F4 in all points of interest, the set of values is selected of which the maximum value is minimal. The points of interest comprise all intersection points P4*i* of the functions F1 to F4 and the two border values P4min, P4max. Alternatively, the particular constraint may be that, of the set of values in every point of interest, the minimum value is determined and that the point of interest is selected at which this minimal value is maximal.

If all the intersections are outside the valid range VS, p4opt will be equal to one of the boundary values p4min or p4max.

Figure 4:
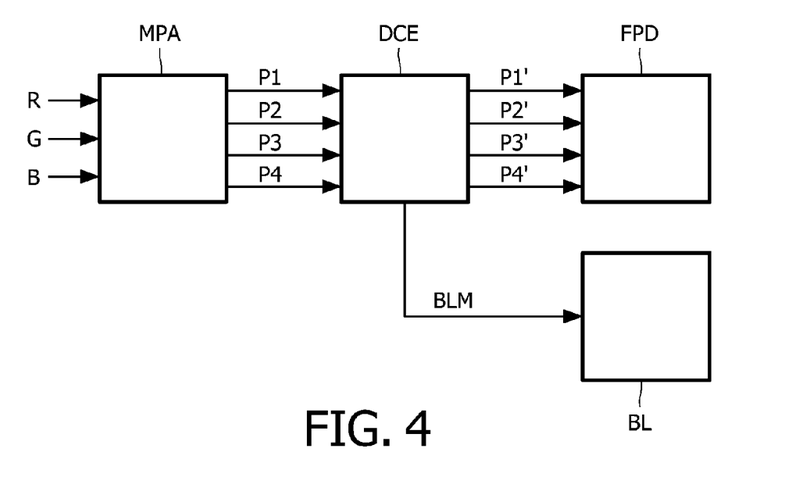
FIG. 4 shows a block diagram of the application of the algorithm in a modulated backlight display.

FIG. 4 shows a block diagram of the application of the algorithm in a modulated backlight display. The multi-primary conversion described hereinbefore is combined with a well known dynamic contrast enhancement technique in displays wherein a lighting unit is present to illuminate the pixel of the display. A well known example is the backlight unit combined with an LCD.

The block MPA represents the multi-primary conversion under the particular constraint in accordance with an embodiment of the invention. The multi-primary conversion receives the three input signals R, G, B and supplies the four drive signals P1 to P4. The dynamic contrast enhancement circuit DCE receives the four drive signals P1 to P4 and supplies corrected drive signals P1' to P4' to the four primary display FPD. The dynamic contrast enhancement circuit DCE further supplies a control signal BLM to the backlight unit BL which illuminates the pixels of the display FPD. The operation of the modulated backlight display is elucidated with respect to FIG. 5.

Figure 5A:
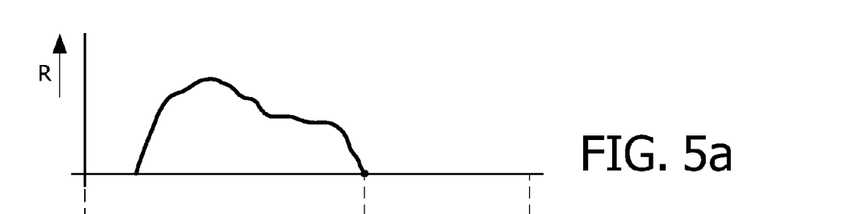
FIGS. 5A to 5C show graphs for elucidating the application in the modulated backlight display.
Figure 5B:
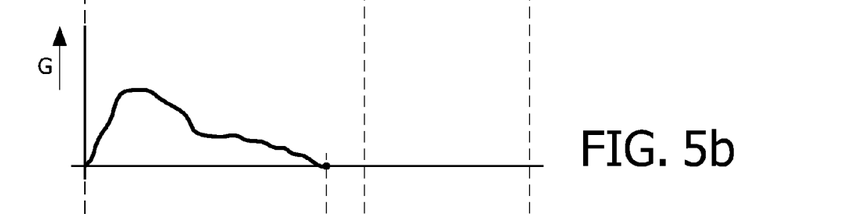
Figure 5C:
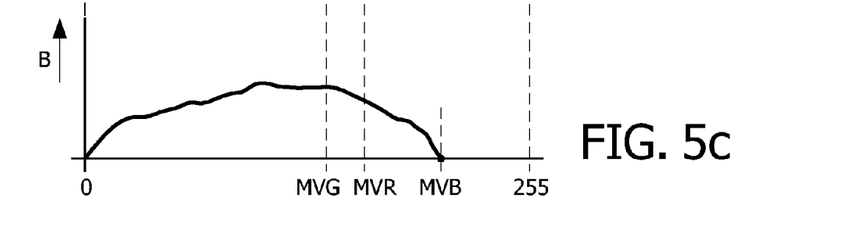

FIGS. 5A to 5C show graphs for elucidating the application of the algorithm in the modulated backlight display with three primaries R, G, and B. In all FIGS. 5A to 5C, the horizontal axis represents the possible values of the input signals R, G, B. In the example shown, the input signals R, G, B are 8 bit words witch values ranging from 0 to 255. The vertical axis represents the number of times a value occurs in a particular input image.

FIG. 5A shows the histogram for the input signal R which usually represents the red primary color. For the particular input image, the highest value of the input signal R is MVR. FIG. 5B shows the histogram for the input signal G which usually represents the green primary color. The highest value of the input signal G is MVG. FIG. 5C shows the histogram for the input signal B which usually represents the blue primary color. The highest value of the input signal B is MVB.

In the example shown, the input signal B has the highest maximum value. Consequently, it is possible to amplify the input signals R, G, B all with a same factor which is selected such that the value MVB becomes equal to 255. The backlight unit BL has to be controlled such that its luminance decreases with the same factor to obtain a same luminance of the display as with the original R, G, B input signals and the original luminance of the backlight unit BL.

The multi-primary conversion MPA maps the input signals R, G, B (which usually are the EBU R, G, B signals) into the drive values P1 to P4 under the constraint that the maximum value of the drive values P1 to P4 is minimal. Consequently, the backlight unit BL can be dimmed maximally.

Alternatively, in other applications, it might be advantageous to determine the mapping which maps the input signals R, G, B into the drive values P1 to P4 under the constraint that the minimal value of the drive values P1 to P4 is maximal to avoid low drive values as much as possible, for example, to avoid errors in the gamma function of a particular display.

It is not required that the multi-primary conversion MPA in accordance with the present invention maps the complete input color range defined by the input signals R, G, B in a same manner into the drive values P1 to P4. The multi-primary conversion MPA may use the particular constraint on a subset of the input color range, for example only the colors which are near to the boundaries of the image histogram (FIG. 5 A-C) defined by the input signals R, G, B.

Figure 6:
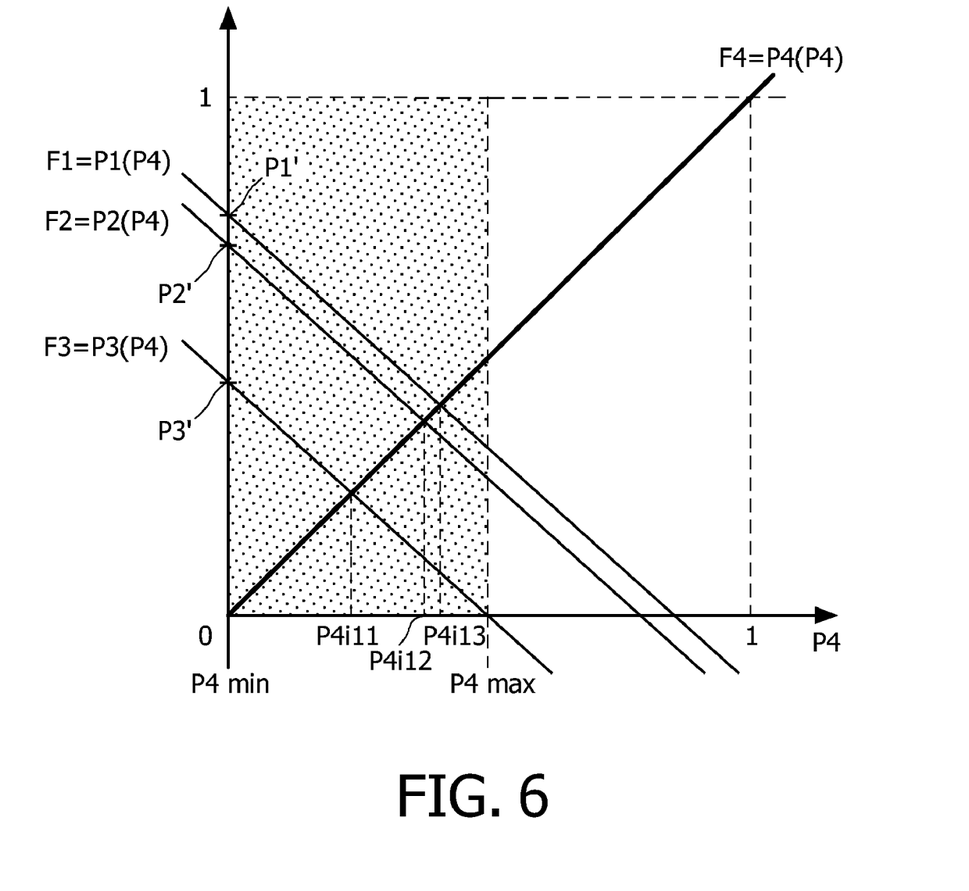
FIG. 6 shows graphs of the four drive values as a function of the fourth drive value for an RGBW display.

FIG. 6 shows graphs of the four drive values as a function of the fourth drive value for an RGBW display.

In a special situation wherein the chromaticity of the W sub-pixel coincides with the white point of the chromaticity diagram created by the RGB sub-pixels, the functions F1 to F3 become simpler: all the coefficients k1 to k3 of Equation 4 have an equal negative value. Thus the lines representing the functions F1 to F3 intersect the line P4=P4 under the same angle. If further the maximal possible luminance of the W sub-pixel is equal to the maximal possible luminance of the RGB-sub-pixels, then all the coefficients k1 to k3 of Equation 4 have the value −1, and the lines representing the functions F1 to F3 intersect the line P4=P4 under 90 degrees.

In the specific embodiment shown in FIG. 6, the display FPD comprises RGBW (red, green, blue, white) sub-pixels wherein in equation 4 the coefficients k1 to k3 are all −1. Consequently, the function F1 to F3 are straight lines which intersect the line P4=P4 under 90 degrees and which have a start value at the vertical axis of P1', P2', and P3', respectively. Such a display allows for a particular efficient backlight modulation because most of the colors partly use the white component. The valid range of the fourth drive value P4 now covers the values 0 to 1.

The intersection of the functions F1=P1(P4) and F4=P4 (P4) occurs for P4=P4$i$13. The intersection of the functions F2=P2(P4) and F4 occurs for P4=P4$i$12. The intersection of the functions F3=P3(P4) and F4 occurs for P4=P4$i$11. The values of all functions F1 to F4 is determined at each of these intersection values of P4 and at the border values 0 and 1. The maximum values of the functions F1 to F4 at each of these values of P4 are compared, and the value of P4 is selected at which this maximum value is minimal.

In the example shown in FIG. 6, for P4=0, the maximum value is P1', for P4=P4$i$11 and for P4=P4$i$12 the maximum value is the value of the function F1, for P4=P4$i$13 the maximum value is the value of the function F1 which is equal to the value of F4, at P4=p4max, the maximum value is the value of the function F4. From FIG. 6, it is clear that the minimum value of the determined maximum values occurs at P4=P4$i$13.

It is important in a system which comprises a camera, a printer, and a display, that the correct color is printed and displayed. Therefore, the image information exchanged between the camera and the printer or display device should be in a universal format. This universal format is preferably the XYZ color space. The devices which are receiving the image from the camera have a color management module which converts the image in the XYZ color space to the color space required by the device. In a printer, this color management module converts the image in the XYZ space usually to a CMY color space. In a display, the color management module converts the image in the XYZ space usually to a RGB color space. However, in a display in accordance with the invention, the color management module in the display converts the image in the XYZ space to the color space defined by the four primary colors of the four sub-pixels. This conversion may be performed directly or via the RGB color space.

Further, it has to be noticed that in practice, the algorithmic components disclosed in this text may be, entirely or in part, realized as hardware, or as software running on a special digital signal processor or a generic processor, etc. The hardware may be a part of an application specific IC.

The term "computer program product" should be understood any physical realization of a collection of commands enabling a generic or special purpose processor to execute any of the characteristic functions of an invention. The commands may be loaded in one step or in a series of loading steps into the processor. The series of loading steps may include intermediate conversion steps, such as for example, a translation into an intermediate language, and/or into a final processor language. In particular, the computer program product may be realized as data on a carrier such as, for example, a non-transitory computer-readable storage medium in the form of a disk or tape, or a memory. The computer program product may alternatively be data traveling over a wired or wireless network connection, or program code on any other medium such, as for example, paper. Apart from program code, characteristic data required for the program may also be embodied as a computer program product. Some of the steps required for the operation of the method, such as, for example, data input and output steps, may be already present in the functionality of the processor instead of being defined in the computer program product.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of converting a three-primary color input signal comprising a first, a second, and a third input signal (C1, C2, C3) into a four-primary color drive signal comprising a first, second, third, and fourth drive signal (P1, P2, P3, P4) for driving four primary colors of a multi-primary color additive display (3), the method comprises:
  defining three functions (F1, F2, F3) representing the first, second, and third drive signal (P1, P2, P3) as a function of the fourth drive signal (P4), each one of the three functions (F1, F2, F3) being defined by the three-primary color input signal and coefficients defining a dependence between the primary colors associated with the first, second and third drive signals (P1, P2, P3) and the primary color associated with the fourth drive signal (P4);
  determining intersection values (P4$i$) of the fourth drive signal (P4) at a set of intersections of: the three functions (F1, F2, F3) mutually, and of the three functions (F1, F2, F3) and a line (F4) defined by the fourth drive signal (P4)

being equal to itself, wherein only the intersection values (P4$i$) of functions having opposite signs of their first derivative are relevant;

determining boundary values (P4min, P4max) of a valid range (VR) of values of the fourth drive signal (P4), in which valid range (VR) all drive signals (P1, P2, P3, P4) have valid values;

determining calculated values (CV1, CV2, CV3) of the first, second and third drive signals (P1, P2, P3) at the intersection values (P4$i$) and the boundary values (P4min, P4max);

selecting a maximum value (Vmax) or minimum value (Vmin) of the calculated values (CV1, CV2, CV3) at each one of the intersection values (P4$i$) and each one of the boundary values (P4min, P4max); and selecting the intersection value (P4$i$) or the boundary value (P4min, P4max) at which the maximum value (Vmax) or minimum value (Vmin) is minimum or maximum, respectively.

2. A method as claimed in claim 1, wherein the three functions (F1, F2, F3) are three lines determined by $$\begin{bmatrix} P1 \\ P2 \\ P3 \end{bmatrix} = \begin{bmatrix} P1' \\ P2' \\ P3' \end{bmatrix} + \begin{bmatrix} k1 \\ k2 \\ k3 \end{bmatrix} \times P4$$

wherein P1 to P4 are the first, second, third, and fourth drive signal, respectively, P1', P2', P3' are defined by the first, second, and third input signal (C1, C2, C3), and the coefficients k1 to k3 define a dependence between three primaries associated with the first, second, and third drive signals (P1, P2, P3), and another primary associated with the fourth drive signal (P4).

3. A method as claimed in claim 2, wherein the fourth drive signal (P4) being equal to itself is defined by $$P4 = P4' + k4 * P4 \text{ wherein } P4' = 0 \text{ and } k4 = 1$$

and wherein for a given pair of the lines of which the associate coefficients (k1, k2, k3, k4) have different signs, the intersection value (P4$i$) is $$P4i = (Pj - Pm)/(km - kj) \text{ wherein}$$

Pj is the one of the P1', P2', P3', P4' associated with a first line of the pair of lines, Pm is the one of the P1', P2', P3', P4' associated with a second line of the pair of lines, kj is the one of the coefficients k1, k2, k3, k4 associated with the first line, and km is the one of the coefficients k1, k2, k3, k4 associated with the second line.

4. A method as claimed in claim 1, wherein an intersection value (P4$i$) outside the valid range of the fourth drive value (P4) is clipped to the one of the boundaries values (P4min, P4max) nearest to the intersection value (P4$i$) to obtain a clipped fourth intersection value (P4min; P4max), and wherein the clipped fourth intersection value (P4min; P4max) is used in the determining the calculated value (CV1, CV2, CV3, P4$i$) associated with the intersection value (P4$i$) outside the valid range.

5. A method as claimed in claim 1, wherein the valid range (VR) of the fourth drive signal (P4) wherein all drive signals (P1, P2, P3, P4) have valid values, is determined by performing the steps of:

determining for the first, second, and third drive signal (P1, P2, P3) an respective range of the fourth drive signal (P4) for which the first, second, or third drive signal (P1, P2, P3) has valid values, and determining (1) the valid range (VR) as a common range of the fourth drive signal (P4) wherein each one of the first, second, and third drive signal (P1, P2, P3) has valid values.

6. A method as claimed in claim 5, further comprising clipping of the input signal (C1, C2, C3) if the common range of the fourth drive signal (P4) is not realizable.

7. A system for converting a three primary color input signal comprising a first, a second, and a third input signal (C1, C2, C3) into a four primary color drive signal comprising a first, second, third, and fourth drive signal (P1, P2, P3, P4) for driving four primary colors of a multi-primary color additive display (3), the system comprises:

means for defining three functions (F1, F2, F3) representing the first, second, and third drive signal (P1, P2, P3) as a function of the fourth drive signal (P4), each one of the three functions (F1, F2, F3) being defined by the three-primary color input signal and coefficients defining a dependence between the primary colors associated with the first, second and third drive signals (P1, P2, P3) and the primary color associated with the fourth drive signal (P4);

means for determining intersection values (P4$i$) of the fourth drive signal (P4) at a set of intersections of: the three functions (F1, F2, F3) mutually, and of the three functions (F1, F2, F3) and a line (F4) defined by the fourth drive signal (P4) being equal to itself, wherein for only the intersection values (P4$i$) of functions having opposite signs of their first derivative are relevant;

means for determining boundary values (P4min, P4max) of a valid range (VR) of values of the fourth drive signal (P4), in which valid range (VR) all drive signals (P1, P2, P3, P4) have valid values allowable in the implementation;

means for calculating values (CV1, CV2, CV3) of the first, second and third drive signals (P1, P2, P3) at the intersection values (P4$i$) and the boundary values (P4min, P4max);

means for selecting a maximum value (Vmax) or minimum value (Vmin) of the calculated values (CV1, CV2, CV3) at each one of the intersection values (P4$i$) and each one of the boundary values (P4min, P4max); and means for selecting the intersection value (P4$i$) or the boundary value (P4min, P4max) at which the maximum value (Vmax) or minimum value (Vmin) is minimum or maximum, respectively.

8. A display apparatus comprising the system of claim 7, an signal processor for receiving an input signal representing an image to be displayed to supply the first, second, and third input signal (C1, C2, C3) to the system, and a display device for receiving the first, second, third, and fourth drive signal (P1, P2, P3, P4) to sub-pixels of the display device.

9. A display apparatus as claimed in claim 8, further comprising a light unit for illuminating the sub-pixels and having an input for receiving a modulating signal for modulating the intensity of light generated by the light unit, wherein the means for selecting a maximum value (Vmax) or minimum value (Vmin) is configured for selecting the maximum value, and the means for selecting the intersection value (P4$i$) are configured for selecting the minimum value (Vmin) of the selected maximum values, and wherein the display apparatus further comprises a control unit for receiving the first, second, third, and fourth drive signal (P1, P2, P3, P4) to supply the modulating signal to decrease the intensity of the light and to increase an amplitude of the first, second, third, and fourth drive signal (P1, P2, P3, P4) accordingly if the one of the first, second, third, and fourth drive signal (P1, P2, P3, P4) having the largest amplitude has an amplitude lower than or equal to a maximum allowable amplitude.

10. A display apparatus as claimed in claim 8, wherein the display device has a gamma function, and wherein the means for selecting a maximum value (Vmax) or minimum value (Vmin) is configured for selecting the minimum value, and the means for selecting the intersection value (P4i) are configured for selecting the maximum value (Vmax) of the selected minimum values.

11. A display apparatus as claimed in claim 8, wherein the display device has a gamma function, and wherein the means for selecting a maximum value (Vmax) or minimum value (Vmin) is configured for selecting the maximum value, and the means for selecting the intersection value (P4i) are configured for selecting the minimum value (Vmin) of the selected maximum values.

12. A non-transitory computer-readable storage medium having stored thereon a computer program comprising processor readable code for causing a processor to execute the method of claim 1, the processor readable code comprising:

code for defining three functions (F1, F2, F3) representing the first, second, and third drive signal (P1, P2, P3) as a function of the fourth drive signal (P4), each one of the three functions (F1, F2, F3) being defined by the three-primary color input signal and coefficients defining a dependence between the primary colors associated with the first, second and third drive signals (P1, P2, P3) and the primary color associated with the fourth drive signal (P4);

code for determining intersection values (P4i) of the fourth drive signal (P4) at a set of intersections of: pairs of the three functions (F1, F2, F3) mutually, and of the three functions (F1, F2, F3) and a line (F4) defined by the fourth drive signal (P4) being equal to itself, wherein only the intersection values (P4i) of functions having opposite signs of their first derivative are relevant;

code for determining boundary values (P4min, P4max) of a valid range (VR) of values of the fourth drive signal (P4), in which valid range (VR) all drive signals (P1, P2, P3, P4) have valid values allowable in the implementation;

code for determining calculated values (CV1, CV2, CV3) of the first, second and third drive signals (P1, P2, P3) at the intersection values (P4i) and the boundary values (P4min, P4max);

code for selecting a maximum value (Vmax) or minimum value (Vmin) of the calculated values (CV1, CV2, CV3) at each one of the intersection values (P4i) and each one of the boundary values (P4 min, P4max); and code for selecting the intersection value (P4i) or the boundary value (P4min, P4max) at which the maximum value (Vmax) or minimum value (Vmin) is minimum or maximum, respectively.

13. The non-transitory computer-readable storage medium as claimed in claim 12, wherein the computer program is a software plug-in for an image processing application.

14. A camera comprising the system of claim 7, and an image sensor supplying the first, second, and third input signal (C1, C2, C3).

15. A portable device comprising the camera of claim 14.

* * * * *